Patented June 8, 1926.

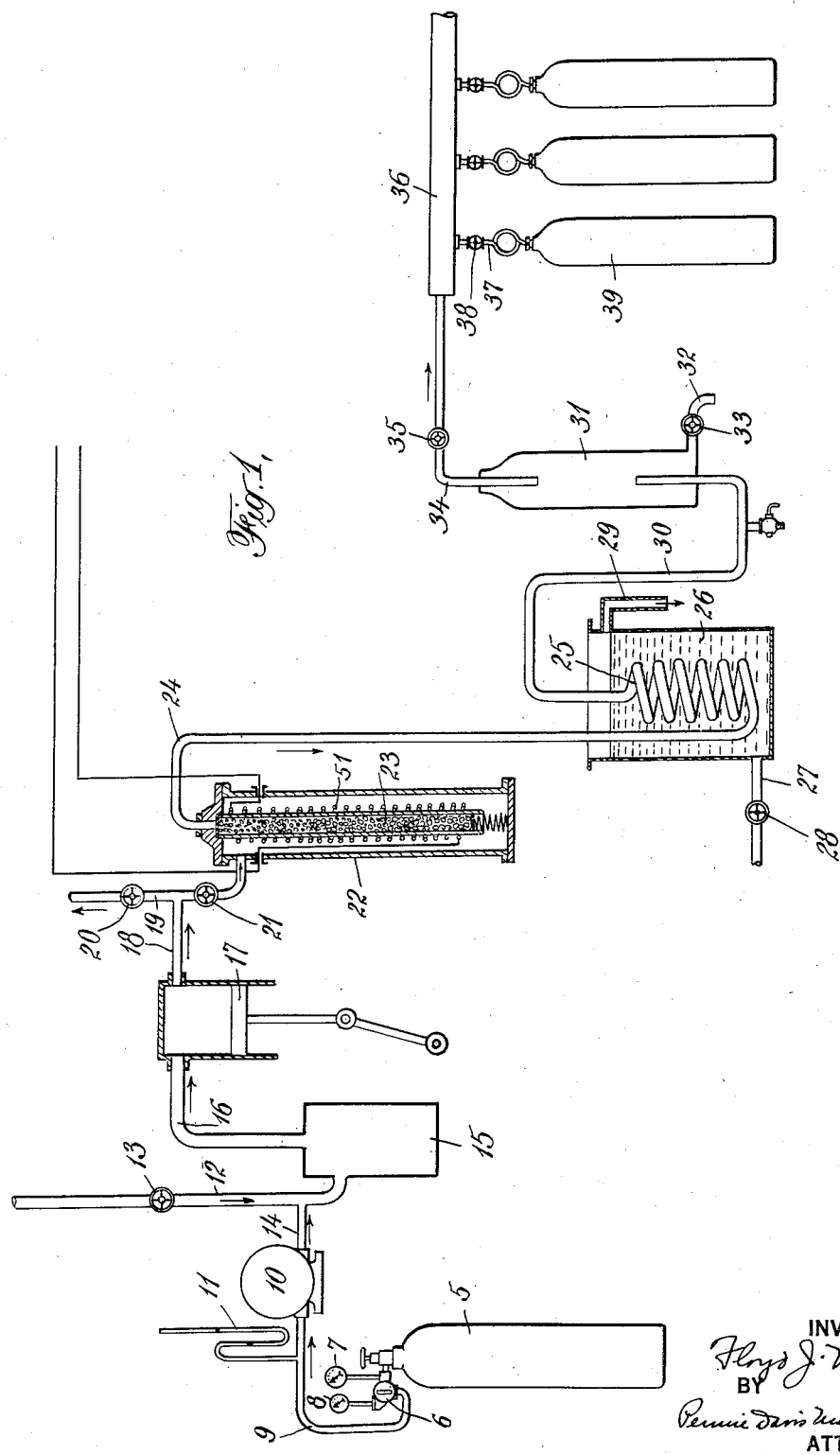

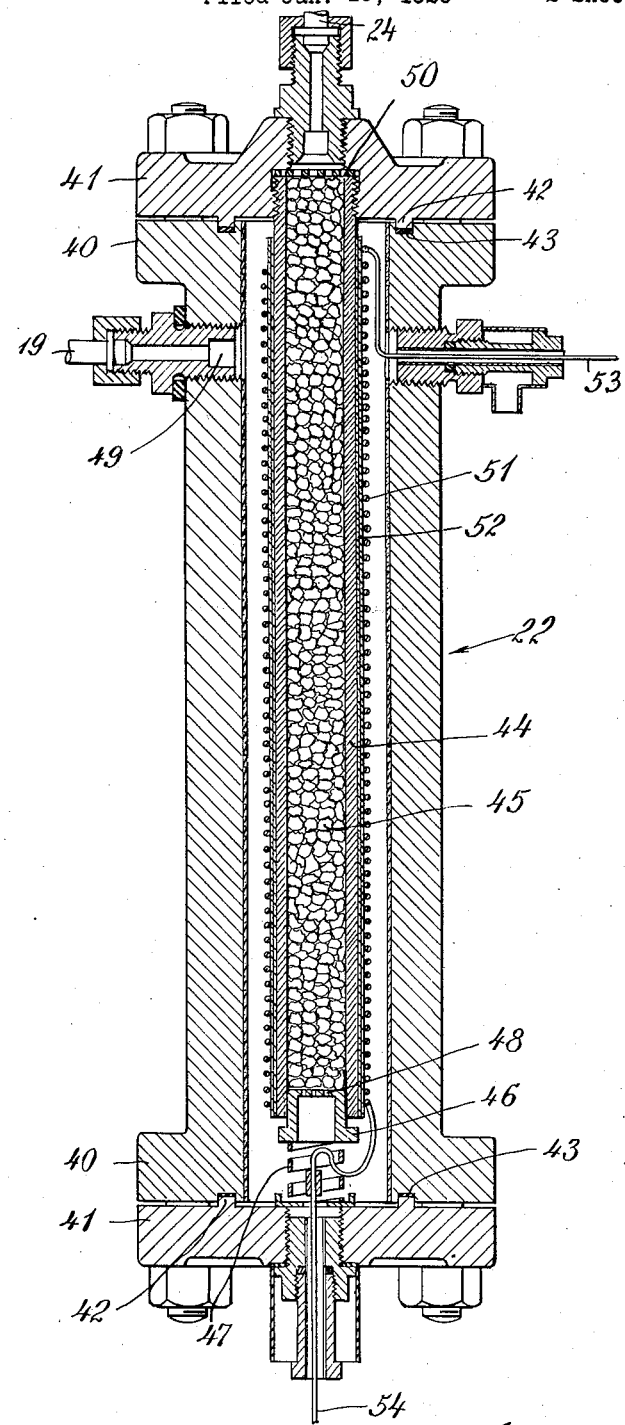

1,588,258

UNITED STATES PATENT OFFICE.

FLOYD J. METZGER, OF NEW YORK, N. Y., ASSIGNOR TO AIR REDUCTION COMPANY, INCORPORATED, OF NEW YORK, N. Y., A CORPORATION OF NEW YORK.

PRODUCTION OF OXYGEN-FREE NITROGEN.

Application filed January 15, 1926. Serial No. 81,466.

This invention relates to the purification of gases and particularly to the complete removal of oxygen from gases such as nitrogen.

For many industrial purposes such as the annealing of wire, it is desirable to employ an inert gas containing no traces of oxygen. The industrial methods for the preparation of gases such as nitrogen are such that a certain amount of oxygen is always present therein either as the result of incomplete separation or of leakage of air into the containers for the gas or the pipe lines in which it is conveyed. Large quantities of nitrogen can be obtained at a relatively low cost from the atmosphere by the liquefaction method, but the separation of oxygen from the nitrogen is never complete under ordinary commercial conditions and consequently this cheap nitrogen is not suitable for the industrial purposes mentioned.

It is the object of the present invention to provide a method of and apparatus for removing oxygen from gases such as nitrogen at relatively slight expense, and particularly to avoid the contamination of the purified gas by the introduction of air thereto after purification.

The removal of oxygen from gases such as nitrogen can be accomplished by utilizing the oxygen in the combustion of gases such as hydrogen or carbon monoxide. The amount of oxygen present in commercial nitrogen is not sufficient, however, to permit the maintenance of combustion under ordinary conditions. It is, nevertheless, possible to carry on the combustion by mixing a combustible gas in the proper proportions depending upon the oxygen content with the nitrogen and then conveying the gaseous mixture over a suitable catalyst which is maintained at the proper temperature. Various catalysts are adapted for use in conducting the purification, but for the purpose of the invention carborundum appears to be most active and otherwise suitable. Thus, if a mass of carborundum is disposed in a suitable chamber and maintained at a temperature preferably above 400° C., the oxygen present in the gaseous mixture containing combustible constituents will be consumed during the relatively rapid movement of the gaseous mixture over the catalyst. The reaction is accelerated by introducing the gaseous mixture at a very considerable pressure, for example, between 1000 and 2000 pounds per square inch, and the use of relatively high pressures has the additional advantage that air at normal atmospheric pressure cannot enter the system through which the gaseous mixture passes. It is preferable to not only conduct the reaction at the high pressure, but also to separate any condensable products under substantially the same pressure and to maintain the pressure in the pipes through which the gaseous mixture passes to the high pressure cylinders in which it is stored and transported. The amount of combustible gas which is added to the gaseous mixture of nitrogen and oxygen, for example, will vary depending upon the proportion of oxygen which is present, and sufficient of the combustible gas should be added to ensure the complete conversion of oxygen into oxidation products. Preferably, a small excess of the combustible gas should be employed and in certain cases where this excess is particularly desirable any desired amount of the combustible gas may be added, the surplus being retained in the resulting product and stored therewith in the storage and transportation cylinders.

In carrying out the invention nitrogen, for example, containing a small percentage of oxygen is mixed with hydrogen in slight excess of the amount required to burn with all of the oxygen present. The gaseous mixture is then compressed to approximately 2000 pounds per square inch and at this pressure is introduced to a chamber, the walls of which have sufficient strength to withstand the pressure at the temperature maintained therein. Owing to the possible effect of the nitrogen or other gas at high temperature upon the pressure-sustaining wall, it is necessary to employ a highly resistant metal of great strength such as nickel steel. The chamber may be provided with an internally disposed catalyst compartment in which carborundum in granulated condition is disposed. The granules of carborundum should be of relatively small size to ensure the maximum surface contact with the gaseous mixture. The arrangement is preferably such that the entering gaseous mixture passes first through a space between the catalyst container and the pressure-sustaining wall and any suitable heating means may be disposed within the chamber to raise the entering gaseous mixture to the required temperature. Electric heating elements are most effective for this purpose and can be applied readily in the form of coils disposed about the catalyst container. If the gaseous mixture is properly heated to the required temperature the oxygen present will upon contact with the catalyst be consumed entirely in burning the combustible constituent and the gaseous mixture will escape from the catalyst entirely free from its oxygen content. This oxygen-free gaseous mixture is then conveyed at the initial pressure through a suitable cooling coil which may be immersed, for example, in a bath of cooling water. It passes thence to a purge bottle or other device wherein any condensed moisture is separated. After the separation of the moisture the gaseous mixture can be delivered at the pressure maintained in the system to the storage cylinders which for convenience can be attached to a manifold so that a number of cylinders can be filled at one time while the process is in continuous operation. New cylinders can be attached to the manifold from time to time as some of the cylinders are filled with gas at the pressure maintained in the system. To avoid the introduction of air in the cylinders the latter should be subjected to a vacuum or flushed thoroughly with oxygen-free gas before they are attached to the manifold.

In the accompanying drawing, Fig. 1 is a diagrammatic illustration of the complete system wherein the gas is mixed, compressed, burned and cooled before it enters the storage cylinders; and Fig. 2 is a longitudinal section through the combustion chamber.

Referring to Fig. 1 of the drawing, 5 indicates a source of a combustible gas such as a cylinder containing hydrogen under pressure with is attached to the usual pressure-reducing valve 6 having pressure indicators 7 and 8 to a pipe 9 leading to a flowmeter 10. A pressure gauge 11 is connected preferably to the pipe 9 to ensure accurate control of the pressure of the combustible gas which is fed to the system. Nitrogen, for example, is supplied from any suitable source through a pipe 12 controlled by a valve 13 to which the combustible gas is delivered to the flowmeter 10 through a pipe 14. The two gases are delivered to a receiver 15 in which they are mixed and from the receiver 15 a pipe 16 conveys them to a compressor 17 wherein they are raised to the desired pressure, for example, from 1000 to 2000 pounds per square inch. The compressed gas is delivered by a pipe 18 to a pipe 19 having a valve 20 which controls the discharge of the gas to the atmosphere in case of necessity. A valve 21 permits the gas from the pipe 19 to flow into the catalyzer chamber 22. After passing through the catalyst 23 in the catalyzer chamber the gas free from oxygen is delivered through a pipe 24 to a cooling coil 25 which is disposed in a suitable receptacle 26 adapted to be supplied with water through an inlet 27 controlled by a valve 28. The surplus water is discharged through an overflow 29. After passing through the coil the cooled gaseous mixture is delivered through a pipe 30 to a purge bottle 31 having a drain outlet 32 controlled by a valve 33. This permits the removal of accumulated moisture from the purge bottle. The gas, after passing through the purge bottle, is delivered through a pipe 34 controlled by a valve 35 to a manifold 36 having a plurality of suitable connections 37 controlled by valves 38 to permit the introduction of the gas to the storage cylinders 39.

The catalyst chamber 22 consists of a thick walled tube having flanges 40 at its ends to receive heads 41. Preferably a dove-tailed joint 42 is provided between the heads and flanges and suitable gaskets 43 of some soft metal such as copper are introduced in the joints to ensure against leakage of the gas under the relatively high pressures maintained. A tube 44 is disposed within the catalyst chamber and is supported preferably upon one of the heads 41. It extends substantially through the chamber and is filled with granules 45 of carborundum or other suitable catalyst material. A cap 46 is loosely disposed within the free end of the catalyst tube and is supported by a spring 47 to permit expansion of the body of catalyst. The cap is perforated at 48 to permit the gaseous mixture to enter the catalyst chamber.

The gaseous mixture enters the pressure-sustaining tube from the pipe 19 through an inlet 49 and travels through the space surrounding the catalyst tube to the opposite end thereof, thence passing through the openings 48 and through the body of catalyst. The gaseous mixture escapes through a perforated plate 50 at the opposite end of the catalyst tube and thence to the pipe 24. The catalyst and the entering gaseous mixture are heated preferably by means of an electric resistance coil 51 which is wound upon the catalyst tube 44, suitable insulating material 52 being disposed between the coil and the tube. External connections 53 and 54 are provided to permit the delivery of electric current to the electric resistance and suitable control devices may be employed to regulate the amount of current used for heating the chamber and thus the temperature of the gaseous mixture during the reaction.

The operation of the method and apparatus are relatively simple, it being necessary merely to determine the minimum amount of required combustible gas which must be added to the mixture and to adjust the valves to permit this amount of the combustible gas to enter with the stream of nitrogen or other gas to be purified. The compressor operates with comparatively slight attention to raise the pressure of the gaseous mixture to the desired point and when once initiated the reaction proceeds uniformly and rapidly in the catalyst. The combustion is substantially instantaneous and all of the oxygen is converted into oxidation products by the time that the gaseous mixture has passed through and escaped from the catalyst. Cooling can be accomplished at a sufficient rate to condense substantially all of the moisture in the stream of gas leaving the catalyst so that the gas may be delivered substantially dry and at atmospheric temperature directly to the storage cylinders. If these cylinders are prepared by the removal of all traces of oxygen therefrom before they are connected to the manifold the gas stored therein will be absolutely free from oxygen and can be utilized for any purpose in which the presence of traces of oxygen would be detrimental to the results obtained. The possibility of preventing the introduction of air to the system by maintaining the pressure throughout the system from the compressor to the storage cylinder is an important advantage aside from the avoidance of the cost of recompressing the gases. It makes possible the production and distribution of oxygen-free gases in commercial quantity.

Various changes may be made in the details of operation and in the structure of the apparatus employed without departing from the invention or sacrificing any of the advantages thereof.

I claim:—

1. The method of separating oxygen from gaseous mixtures, which comprises adding thereto a combustible gas, causing the mixture to contact with carborundum at a temperature sufficient to maintain combustion of the combustible gas in the presence of the oxygen and separating the products of combustion from the balance of the gaseous mixture.

2. The method of separating oxygen from gaseous mixtures, which comprises adding thereto a combustible gas, compressing and causing the mixture to contact with carborundum at a temperature sufficient to maintain combustion of the combustible gas in the presence of the oxygen and separating the products of combustion from the balance of the gaseous mixture.

3. The method of separating oxygen from gaseous mixtures, which comprises adding thereto a combustible gas, compressing and causing the mixture to contact with carborundum at a temperature sufficient to maintain combustion of the combustible gas in the presence of the oxygen and separating the products of combustion from the balance of the gaseous mixture while it is maintained at substantially the initial pressure.

4. The method of separating oxygen from gaseous mixtures, which comprises adding thereto a combustible gas, compressing and causing the mixture to contact with carborundum at a temperature sufficient to maintain combustion of the combustible gas in the presence of the oxygen, separating the products of combustion from the balance of the gaseous mixture while it is maintained at substantially the initial pressure and delivering the gas without substantial reduction of pressure to storage receptacles.

5. The method of separating oxygen from gaseous mixtures, which comprises adding thereto a combustible gas, causing the mixture to contact with carborundum at a temperature of about 400° C. and separating the products of combustion from the balance of the gaseous mixture.

6. The method of separating oxygen from gaseous mixtures, which comprises adding thereto a combustible gas, compressing the mixture to from 1000 to 2000 pounds per square inch, causing the mixture to contact with carborundum at a temperature of about 400° C. and separating the products of combustion from the balance of the gaseous mixture.

In testimony whereof I affix my signature.

FLOYD J. METZGER.